May 30, 1967 C. T. FLACHBARTH 3,322,442
SERVICE INSERT FOR UNDERFLOOR DISTRIBUTION SYSTEMS
Filed March 27, 1964
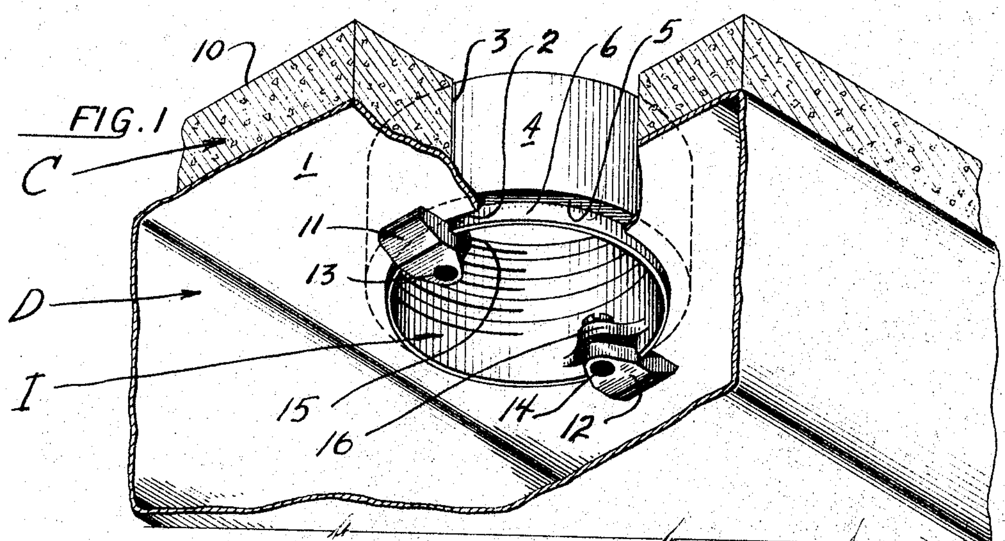
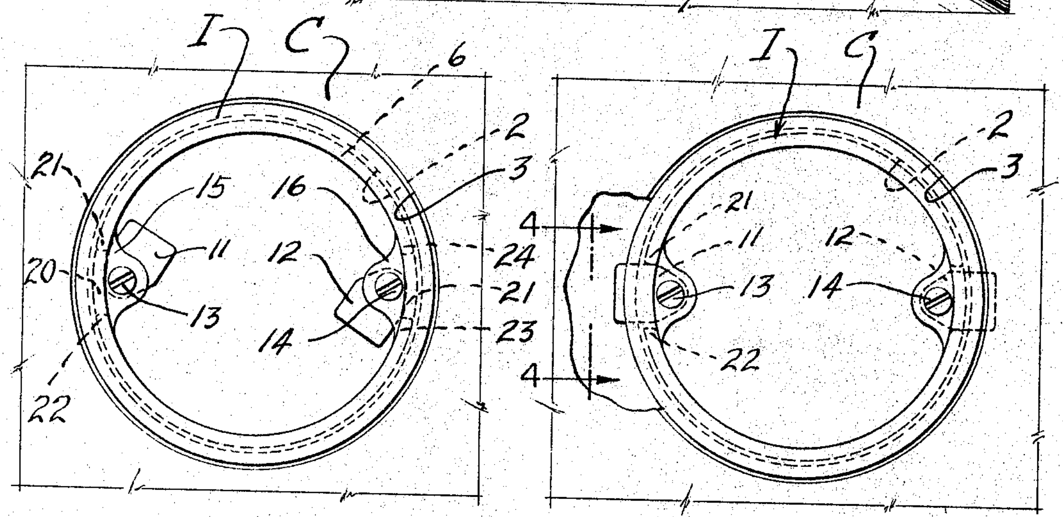
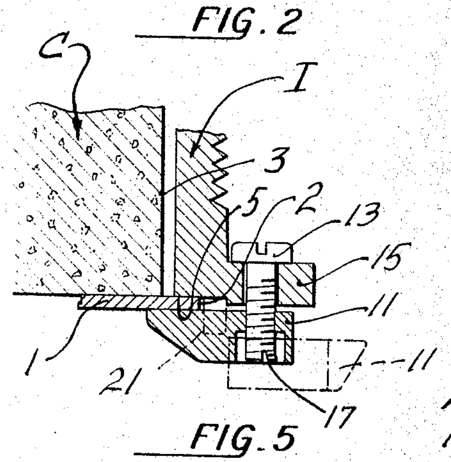
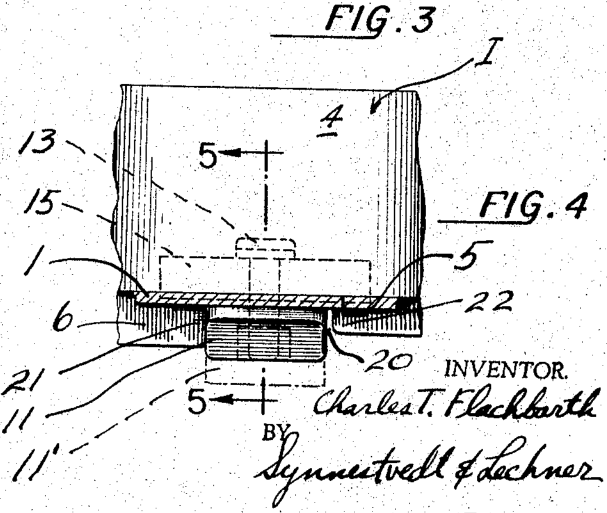
INVENTOR.
Charles T. Flachbarth
BY Synnestvedt & Lechner
ATTORNEYS

United States Patent Office 3,322,442

Patented May 30, 1967

3,322,442

SERVICE INSERT FOR UNDERFLOOR DISTRIBUTION SYSTEMS

Charles T. Flachbarth, Wynnewood, Pa., assignor to Textron, Inc., Providence, R.I., a corporation of Rhode Island Filed Mar. 27, 1964, Ser. No. 355,311
2 Claims. (Cl. 285—208)

This invention in general relates to certain improvements for electrical distribution systems of the type wherein power and communication conductors are carried in ducts or headers buried in a concrete floor, the conductors being connected to the floor area via service fittings. Such systems are generally known in the art as underfloor systems.

In such underfloor systems it is oftentimes necessary to bring the power or communication conductors to an area on the floor where there is no ready means of access into the duct.

For such purposes it is common in the art to provide access means by cutting a hole in the concrete, cutting a hole in the top of the duct and then setting an insert on the duct. The insert extends between the top of the duct and the top of the floor. The insert is provided with means for attaching the same to the top of the duct and also arranged for accepting an on-the-floor service fitting.

The present invention relates to improvements in such afterset inserts and has several important advantages over prior devices.

One advantage is that the installation procedure is extremely simple, straightforward and does not require any special skills or training. This is especially valuable from the standpoint of savings in labor costs. Further, the insert disclosed herein can be secured in place by means of a mechanic's screwdriver. This eliminates the need for any special crimping or expanding tools which must be utilized for installing known inserts.

Another important advantage is that the insert is so locked to the duct that extraordinary and unusual forces would be required to jar the same loose.

Another advantage is that the insert structure is arranged so that the installation of a threaded type service fitting cannot undo the connection between duct and insert. Indeed, the installing of such a service fitting increases the locking force joining the insert and the duct.

The invention contemplates an insert having a hollow, tubular body provided with a pair of clamps each of which can be turned (by a screwdriver) to an inoperative position inside the body. In this position the clamps cannot cause interference when the insert is moved through the access holes to place the same on the duct. When the insert is positioned on the duct, each clamp is turned (by the same screwdriver) to a position where it extends underneath the top of the duct and with continued turning of the screwdriver, the clamp is drawn up to an operative position where it engages the duct and positively locks the duct and insert. The screws are located so that they can be turned by a screwdriver extending through the hollow body.

A preferred form of the invention will be described below in connection with the following drawings wherein:

FIGURE 1 is a pictorial representation of an insert constructed in accordance with the invention and mounted on a typical under-the-floor duct;

FIGURE 2 is a plan view showing the insert set into access holes cut in the concrete and duct with the clamps in the inoperative position;

FIGURE 3 is a view similar to FIGURE 2 but with the clamps in an operative or clamping position;

FIGURE 4 is a fragmentary, elevational view illustrating a clamp in its operative and inoperative positions, the view is taken along the line 4—4 in FIGURE 3; and FIGURE 5 is a fragmentary, sectional view taken along the lines 5—5 in FIGURE 4.

In FIGURE 1 a duct D is shown disposed below a concrete floor C. The duct D has a top 1 in which has been cut an aperture or access hole 2. A larger and coaxial aperture or access hole 3 has been cut in the concrete C. The apertures 2 and 3 accommodate the afterset insert I.

The insert I has a body 4 on one end of which is an annular support surface 5 which rests on the area immediately adjacent the aperture 2. The body 4 also is formed with a locating lip 6 which extends into the aperture 2. The lip 6 is adapted to contact the edge of the aperture 2 and in this position will control the lateral displacement of the insert. The surface 5 and the lip 6 constitute a shoulder which provides the mounting and locating functions. As will be apparent the body 4 extends upwardly through the aperture 3 in the concrete to a point just below the top 10 of the concrete.

The insert I is retained on the duct by the clamp means 11 and 12. Each clamp engages the underside of the duct top 1 and fixedly holds the engaged areas against the surface 5. This locks the duct and insert together.

The clamps are threaded on screws 13 and 14 which are rotatably supported on body 4. Each screw can be turned by a screwdriver extending through the inside of the body to engage the head of the screw. By turning the screw, its connected clamp can be turned to an inoperative position where it extends interiorly of the body of the insert. The inoperative position of the clamp is shown in FIGURE 2. With the clamps in the inoperative position, the insert can be put through the access holes without interference from the clamps so that the insert rests on the duct as shown in FIGURES 1 and 2.

After the insert is placed in the duct, the screws are turned to rotate the clamps to the position shown in FIGURE 2 and with further rotation, the clamps are drawn upwardly into tight engagement with the duct. This is the operative position of the clamps.

The manner in which the clamps are mounted to accomplish the foregoing is described below.

With reference to FIGURES 1 and 2, it will be seen that the body is provided with a pair of feet 15 and 16. The feet are located adjacent the mounting surface 5. Each foot is provided with an aperture which rotatably supports the screws 13 and 14. The screws are not threaded in the feet. The holes are simply oversized so that the screw is free to rotate. Each screw has its axis generally parallel the axis of the body 4.

The clamps 11 and 12 are respectively threaded on the screws 13 and 14. The end of each screw is widened so that the screw and clamp cannot become unthreaded. The widening is accomplished by staking the free end of the screw as indicated at 17 in FIGURE 5.

With reference to FIGURES 2 and 4, it will be observed that the lip 6 is constructed so as to form diametrically opposed slots 20 and 21. These slots are disposed just below the clamps 11 and 12. In its operative position, each clamp is disposed within its slot. For example, with reference to FIGURE 4, it will be seen that the clamp 11 is disposed in the slot 20.

Also, with reference to FIGURE 4, it will be noted that the sections 21 and 22 of the lip 6 which form the respective sides of the slot 20 are of different axial extension, the section 21 extending downwardly to a greater degree than the section 22. The reason for this will be seen shortly. On the opposite side the slot 21 is formed by sections 23 and 24 which are constructed respectively as sections 21 and 22.

The installation of an insert proceeds as follows: First the place in the concrete floor where the fitting is to be attached is selected. Then the aperture or access hole 3 is cut in the concrete. Then the access hole 2 is cut in the top of the duct. The insert is picked up and held at a generally horizontal position and a screwdriver is put into the head of the screw 13 and turned counterclockwise (FIGURE 2) until the clamp 11 strikes the section 21 of the lip 6 and assumes its inoperative position. The screwdriver is then inserted into the head of the screw 14 and turned counterclockwise until the clamp 12 hits the section 23 of the lip 6 and assumes its inoperative position. At this point it will be seen that the clamps 11 and 12 extend into the interior of the body 1. Thus, they offer no intereference for the insert to be placed in the access holes 2 and 3.

As will be apparent, the sections 21 and 23 extend into the path of movement of the clamps and serve as abutments to define the respective inoperative positions of the clamps.

In turning the screws 13 and 14 counterclockwise as described above, the turning is carried out until there is considerable resistance to turning, i.e., until the staked-over end of the screw is tightly engaged with the clamp. When this occurs the clamp occupies its furthermost down position as indicated by the dotted lines 11 in FIGURES 4 and 5. The screw and its clamp are more or less unified so that when the screw is turned (clockwise) the clamp will turn with it.

With the clamps in the inoperative position as described above, the insert is now put into place on the duct. A screwdriver is inserted into the head of the screw 13 and turned clockwise. This rotates screw 13 and clamp 11 clockwise. The rotation continues until such time as the clamp hits the abutment 21. The shortened axial extension of the section 22 of the lip permits the clamp to be turned without interference. The clamp is now positioned just at the bottom of slot 20 and extends underneath the top 1 of the duct and underneath the surface 5 (see dotted line 11' in FIGURE 4). A portion of the area immediately around the access hole 2 is now disposed between the clamp 11 and the surface 5. Further rotation is imparted to the screw and this causes the clamp to be drawn upwardly through slot 20 until it engages the underside of the duct top as illustrated in FIGURES 1 and 5. The clamp 11 fixedly holds the engaged area of the duct firmly against the surface 5. The clamp 12 and screw 14 are similarly manipulated so that the clamp 12 is tight against the underside of the duct.

By drawing the clamps tightly up against the duct, I have provided a very positive and secure locking arrangement. For example, it is not uncommon for inserts constructed in accordance with the invention to be capable of maintaining positions on the duct even with 50 foot pounds of torque.

With reference to the turning of the clamps as between the operative and inoperative positions, it is to be noted that the staked-over end on each clamp performs an important function. The stake-over is located to ensure that in the lowermost position of the clamp on the screw, the clamp will not only be in position to be engaged by the abutment 21 (or 23) but also will be free to turn by clearing the abutment 22 (or 24).

After the insert is locked to the duct, it is ready to receive a service fitting and for this purpose the inside of the body is provided with threads 25.

One of the features of the invention is that the attachment of a fitting will cause the insert to become more tightly locked with the duct. This will be explained in connection with FIGURE 3. In that figure, assume that a service fitting is being screwed into the insert. The fitting is being moved in a clockwise direction. This tends to move the insert, the screw and the clamp in a clockwise direction. The clamp, however, is restrained by the friction forces against the duct. The effect is as if the clamp were tending to rotate counterclockwise. Rotation of the clamp counterclockwise, of course, would tend to make the clamp run up the screw to become more tightly engaged with the duct. The amount of counterclockwise "rotation" of the clamp is determined by the section 22 of the slot 16.

I claim:

1. For an underfloor electrical distribution system, an afterset insert device for mounting in an access hole cut in the distribution duct and in the covering concrete floor to provide a means to connect a service fitting to the duct, the improvement in securing the insert to the duct comprising:

support means on the body for engaging the top of the duct in the area around the access hole;

a foot on the inside of the body of the duct and disposed adjacent one end thereof, the foot being formed with an axially extending aperture;

a screw in said aperture, the screw being mounted in said aperture so that it can be freely rotated by a screw driver extending through the interior of said body to engage and turn the head of the screw;

a clamp threaded on said screw and rotatable therewith; and slotted lip means on said body disposed adjacent said support means for engaging the edge of an access hole, the portions of the lip forming the respective sides of the slot extending different axial lengths, the shorter side being free from the rotational path of the clamp and the longer side extending into the rotational path of the clamp and forming an abutment for engaging the clamp the width of the slot being greater than the width of the clamp, engagement of the clamp and the abutment holding the clamp against rotation, and when so held the clamp being adapted to move along the screw when the same is rotated, and the free end of said screw being enlarged to provide for the screw and the clamp to become tightly engaged whereby the clamp is rotatable with the screw;

the clamp being rotable in one direction to a first position wherein it engages said abutment and extends on the inside of said body so that the insert can be placed in an access hole without interference from the clamp, and while the clamp is in the first position rotation of the screw in said one direction causing the clamp to move along the screw in a direction to contact the enlarged portion and become tightly engaged therewith, and rotation of the screw in the opposite direction causing the clamp to rotate with the screw to a second position wherein it engages said abutment means and extends underneath the duct, and continued rotation of the screw in said opposite direction relieving said tight engagement and causing the clamp to move along the screw in a direction to engage the bottom of the duct and tightly clamp the duct against the support means and thereby fixedly hold the insert on the duct; and when the insert is fixedly held on the duct, a force rotating the insert in said opposite direction causing relative rotation of the clamp in said one direction, the width of said slot permitting last said relative rotation, and the rotation causing the clamp to move along the screw in a direction to more tightly clamp the duct against the support means.

2. For an underfloor electrical distribution system, an afterset insert device for mounting in an access hole cut in the distribution duct and in the covering concrete floor to provide a means to connect a service fitting to the duct, the improvement in securing the insert to the duct comprising:

support means on the body for engaging the top of the duct in the area around the access hole;

a foot on the inside of the body of the duct and disposed adjacent one end thereof, the foot being formed with an axially extending aperture;

a screw in said aperture, the screw being mounted in said aperture so that it can be freely rotated by a screw driver extending through the interior of said body to engage and turn the head of the screw;

a clamp threaded on said screw and rotatable therewith; and slotted lip means on said body disposed adjacent said support means for engaging the edge of an access hole, the portions of the lip forming the respective sides of the slot extending different axial lengths, the shorter side being free from the rotational path of the clamp and the longer side extending into the rotational path of the clamp and forming an abutment for engaging the clamp the width of the slot being greater than the width of the clamp, the engagement of the clamp and the abutment holding the clamp against rotation, and when so held the clamp being adapted to move along the screw when the same is rotated, and the free end of said screw being enlarged to provide for the screw and the clamp to become tightly engaged whereby the clamp is rotatable with the screw;

rotation of the screw in one direction causing the clamp to rotate to a first position wherein it engages said abutment and extends on the inside of said body so that the insert can be placed in an access hole without interference from the clamp, and while the clamp is in the first position rotation of the screw in said one direction causing the clamp to move along the screw in a direction to contact the enlarged portion and become tightly engaged therewith, and rotation of the screw in the opposite direction causing the clamp to rotate with the screw to a second position wherein it engages said abutment means and extends underneath the duct, and continued rotation of the screw in said opposite direction relieving said tight engagement and causing the clamp to move along the screw in a direction to engage the bottom of the duct and tightly clamp the duct against the support means, and thereby fixedly hold the insert on the duct; and when the insert is fixedly held on the duct, a force rotating the insert in said opposite direction causing relative rotation of the clamp in said one direction the width of said slot permitting last said relative rotation, and the rotation causing the clamp to move along the screw in a direction to more tightly clamp the duct against the support means.

References Cited

UNITED STATES PATENTS

| | | | |
|---|---|---|---|
| 292,640 | 1/1884 | Folmer | 138—92 X |
| 1,788,750 | 1/1931 | Snyder | 151—69 |
| 3,166,633 | 1/1965 | Guzan et al. | 52—220 X |
| 3,173,227 | 3/1965 | Clark | 52—22 X |
| 3,204,378 | 9/1965 | Stuessel et al. | 52—221 |
| 3,250,559 | 5/1966 | Sommerfeld | 151—69 |

JOHN E. MURTAGH, *Primary Examiner.*

M. O. WARNECKE, *Assistant Examiner.*